(12) United States Patent
Connor et al.

(10) Patent No.: US 7,799,108 B2
(45) Date of Patent: Sep. 21, 2010

(54) VOLUME-EFFICIENT FILTER

(75) Inventors: Michael J. Connor, Stoughton, WI (US); Michael J. Frame, Madison, WI (US); Gary L. Rickle, Wharton, OH (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 343 days.

(21) Appl. No.: 12/040,079

(22) Filed: Feb. 29, 2008

(65) Prior Publication Data

US 2009/0113862 A1   May 7, 2009

Related U.S. Application Data

(63) Continuation-in-part of application No. 11/305,563, filed on Dec. 16, 2005, now Pat. No. 7,540,895.

(51) Int. Cl.
*B01D 46/00* (2006.01)
(52) U.S. Cl. .................. 55/385.3; 55/481; 55/484; 55/502; 55/482; 123/198 E
(58) Field of Classification Search ................ 55/385.3, 55/481, 484, 502, 482, 498, 510, DIG. 28, 55/483; 93/134, 129; 123/198 E; 60/299, 60/311
See application file for complete search history.

(56) References Cited

U.S. PATENT DOCUMENTS

| | | | |
|---|---|---|---|
| 2,055,774 A * | 9/1936 | Ray ........................... 96/129 |
| 3,127,629 A | 4/1964 | Miller, Jr. | |
| 3,319,401 A * | 5/1967 | Bogardus ..................... 96/129 |
| 3,325,256 A * | 6/1967 | Calvert ........................ 422/111 |
| 3,350,860 A * | 11/1967 | Grassel et al. ................. 96/129 |
| 3,873,287 A | 3/1975 | Barnebey | |
| 3,879,944 A * | 4/1975 | Bertsch ........................ 60/299 |
| 4,175,107 A * | 11/1979 | Iwaoka et al. ................ 422/114 |
| 4,419,113 A * | 12/1983 | Smith ........................... 55/484 |
| 4,512,147 A * | 4/1985 | Wong ............................ 60/274 |
| 4,625,511 A | 12/1986 | Scheitlin | |
| 4,861,359 A | 8/1989 | Tettman | |
| 5,223,011 A | 6/1993 | Hanni | |
| 5,431,706 A | 7/1995 | Paas | |
| 5,810,896 A | 9/1998 | Clemens | |
| 6,416,561 B1 | 7/2002 | Kallsen et al. | |
| 6,482,247 B2 | 11/2002 | Jaroszczyk et al. | |
| 6,511,599 B2 | 1/2003 | Jaroszczyk et al. | |
| 6,641,637 B2 | 11/2003 | Kallsen et al. | |
| 7,041,146 B2 | 5/2006 | Bugli et al. | |
| 2002/0029693 A1 | 3/2002 | Sakakibara et al. | |
| 2002/0033010 A1 | 3/2002 | Schorn | |
| 2007/0137155 A1 | 6/2007 | Furseth et al. | |
| 2007/0221061 A1 | 9/2007 | Steiner et al. | |
| 2008/0110146 A1 | 5/2008 | Germain et al. | |

* cited by examiner

*Primary Examiner*—Duane Smith
*Assistant Examiner*—Minh-Chau Pham
(74) *Attorney, Agent, or Firm*—Andrus, Sceales, Starke & Sawall, LLP; J. Bruce Schelkopf (57) ABSTRACT

A filter includes a housing with multiple flow passages and filter elements providing volume-efficient bottom-in, top-out flow or top-in, bottom-out flow. In another embodiment, parallel filtering flow paths are provided with multiple filter elements having respective overlapped sections axially aligned, with at least one filter element having a radial extension section non-axially aligned with another of the filter elements.

5 Claims, 6 Drawing Sheets

VOLUME-EFFICIENT FILTER

CROSS-REFERENCE TO RELATED APPLICATIONS

This application is a continuation-in-part of U.S. patent application Ser. No. 11/305,563, filed Dec. 16, 2005, now U.S. Pat. No. 7,540,895B2, incorporated herein by reference.

BACKGROUND AND SUMMARY

The invention relates to filters, including air cleaners.

The invention arose during continuing development efforts directed toward filter assemblies providing more efficient use of space and better performance, including a smaller package size and more flexibility in package geometry. The invention also arose during continuing development efforts relating to the above-noted parent application. Like the noted parent application, the present system provides more filter media area in a given volume.

BRIEF DESCRIPTION OF THE DRAWINGS

FIGS. 1-4 are taken from the noted parent '563 application.

DETAILED DESCRIPTION

Parent Application

The following description of FIGS. 1-4 is taken from the noted parent '563 application.

Figure 1:
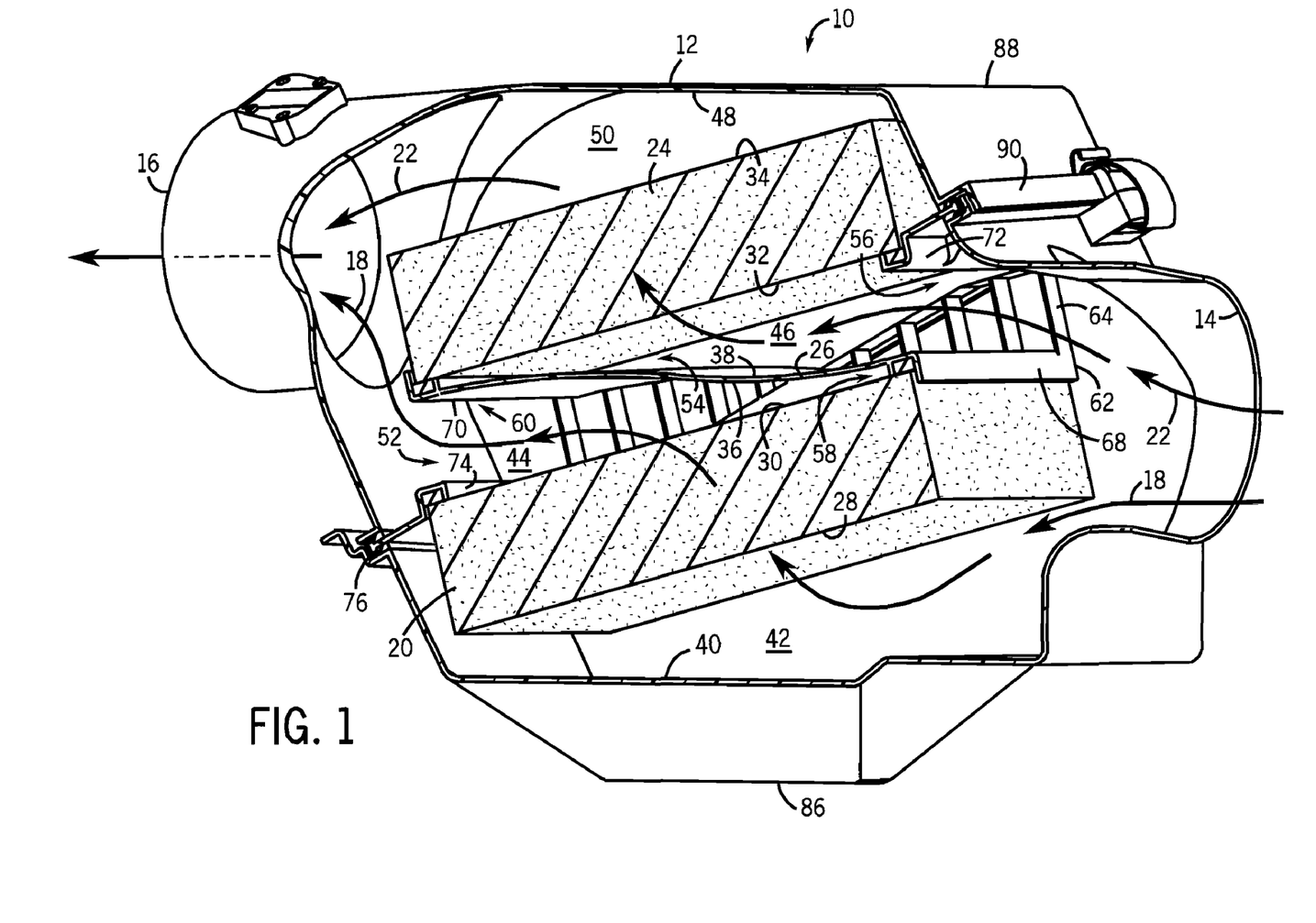
FIG. 1 is a perspective cut-away view of a filter constructed in accordance with the parent invention.
Figure 2:
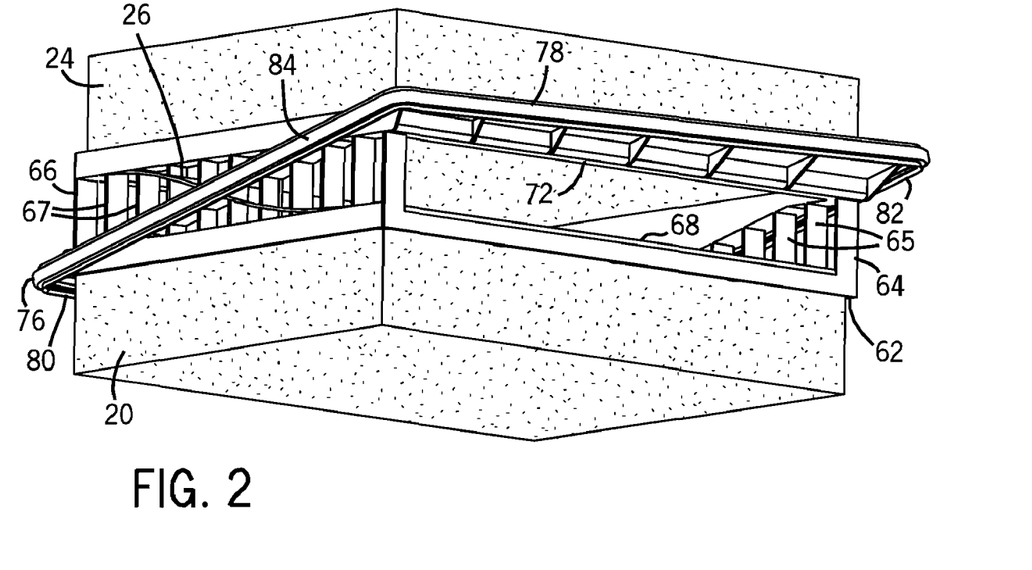
FIG. 2 is a perspective view of a portion of the assembly of FIG. 1.
Figure 3:
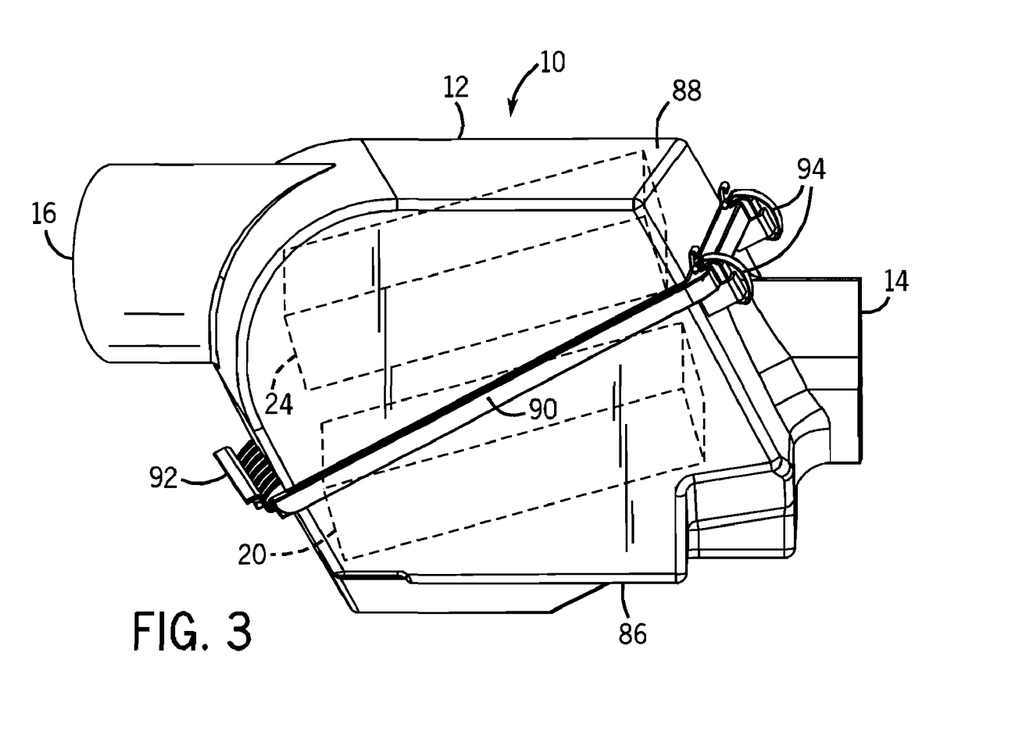
FIG. 3 is a perspective view of the housing of the assembly of FIG. 1.

FIGS. 1-3 show a filter 10 including a housing 12 having an inlet 14 and an outlet 16. A first flow passage 18 is provided through the housing from inlet 14 to outlet 16, and includes a first filter element 20 filtering fluid flowing along first flow passage 18. A second flow passage 22 is provided through the housing from inlet 14 to outlet 16, and includes a second filter element 24 filtering fluid flowing along second flow passage 22. First and second flow passages 18 and 22 are in parallel with each other such that incoming fluid flow at inlet 14 is split into first and second parallel flow paths in first and second flow passages 18 and 22, respectively, and flows through first and second filter elements 20 and 24, respectively, and re-joins at outlet 16. First and second flow passages 18 and 22 through respective first and second filter elements 20 and 24 are independent of each other.

Housing 12 includes an internal dividing wall 26 separating first and second flow passages 18 and 22 such that fluid in first flow passage 18 flows through first filter element 20 to the exclusion of and bypassing second filter element 24, and such that fluid in second flow passage 22 flows through second filter element 24 to the exclusion of and bypassing first filter element 20. First filter element 20 has an upstream face 28 receiving incoming fluid along first flow passage 18 from inlet 14. First filter element 20 has a downstream face 30 delivering filtered fluid along first flow passage 18 to outlet 16. Second filter element 24 has an upstream face 32 receiving incoming fluid along second flow passage 22 from inlet 14. Second filter element 24 has a downstream face 34 delivering filtered fluid along second flow passage 22 to outlet 16. Internal dividing wall 26 has a first surface 36 facing downstream face 30 of first filter element 20. Internal dividing wall 26 has a second surface 38 facing oppositely to first surface 36 and facing upstream face 32 of second filter element. Housing 12 has a first sidewall 40 defining a first plenum 42 between first sidewall 40 and upstream face 28 of first filter element 20. Internal dividing wall 26 has the noted first surface 36 defining a second plenum 44 between surface 36 of internal dividing wall 26 and downstream face 30 of first filter element 20. Internal dividing wall 26 has the noted second surface 38 defining a third plenum 46 between surface 38 of internal dividing wall 26 and upstream face 32 of second filter element 24. Housing 12 has a second sidewall 48 defining a fourth plenum 50 between housing sidewall 48 and downstream face 34 of second filter element 24.

In the preferred embodiment, first and second sidewalls 40 and 48 of the housing are spaced by first filter element 20, internal dividing wall 26, and second filter element 24 respectively in serial spatial alignment therewith. Further in the preferred embodiment, housing sidewalls 40 and 48 are spaced by first plenum 42, first filter element 20, second plenum 44, internal dividing wall 26, third plenum 46, second filter element 24, and fourth plenum 50 respectively in serial spatial alignment therewith. First and third plenums 42 and 46 communicate with each other at inlet 14. Second and fourth plenums 44 and 50 communicate with each other at outlet 16.

First and second filter elements 20 and 24 are spaced from each other by a gap 52. Internal dividing wall 26 is a diagonal wall which diagonally spans gap 52 and defines an upstream triangular shaped plenum 46 having a closed corner end 54 at upstream face 32 of second filter element 24, and having an open end 56 communicating with inlet 14. Diagonal wall 26 also defines a downstream triangular shaped plenum 44 having a closed corner end 58 at downstream face 30 of first filter element 20, and having an open end 60 communicating with outlet 16. In the preferred embodiment, diagonal wall 26 has a non-rectilinear wave shape providing increased entrance area at upstream open end 56 of triangular shaped plenum 46 and reduced area at closed corner end 54 of triangular shaped plenum 46, and providing increased exit area at downstream open end 60 of triangular shaped plenum 44 and reduced area at closed corner end 58 of triangular shaped plenum 44.

A spacer 62 supports first and second filter elements 20 and 24 and maintains gap 52 therebetween. Spacer 62 has first and second spacer walls 64 and 66 extending transversely (up-down in FIGS. 1, 2) across gap 52, and extending longitudinally (left-right in FIGS. 1, 2) between open ends 56 and 60 of upstream and downstream triangular shaped plenums 46 and 44. Spacer walls 64 and 66 are laterally spaced from each other by diagonal wall 26 therebetween. The spacer walls have upstream ends communicating with inlet 14, and have downstream ends communicating with outlet 16. Spacer walls 64 and 66 extend longitudinally (left-right in FIGS. 1, 2) between such upstream and downstream ends. The upstream ends of spacer walls 64 and 66 are laterally spaced by open end 56 of upstream triangular shaped plenum 46 therebetween. The downstream ends of spacer walls 64 and 66 are laterally spaced by open end 60 of downstream triangular shaped plenum 44 therebetween. Diagonal wall 26 has an upstream end 68 spanning laterally between the upstream ends of spacer walls 64 and 66. Diagonal wall 26 has a downstream end 70 spanning laterally between the downstream ends of spacer walls 64 and 66. Spacer 62 has an upstream bridging portion 72 extending laterally between the upstream ends of spacer walls 64 and 66 and transversely spaced from upstream end 68 of diagonal wall 26 by open end 56 of upstream triangular shaped plenum 46 therebetween. Spacer 62 has a downstream bridging portion 74 extending laterally between the downstream ends of spacer walls 64 and 66 and spaced transversely from downstream end 70 of diagonal wall 26 by open end 60 of downstream triangular shaped plenum 44 therebetween. The spacer walls may be solid, or may be provided by a plurality of transversely extending ribs 65, 67, respectively, as shown.

A gasket 76, FIG. 2, seals first and second filter elements 20 and 24 and spacer 62 to housing 12. Gasket 76 has an upstream segment 78 extending along upstream bridging portion 72 of spacer 62, a downstream segment 80 extending along downstream bridging portion 74 of spacer 62, and a pair of laterally spaced diagonal side segments 82 and 84 extending diagonally along spacer walls 64 and 66 diagonally oppositely to the diagonal extension of diagonal wall 26. In FIGS. 1 and 2, diagonal side segments 82 and 84 of the gasket extend diagonally from upper right to lower left, whereas diagonal wall 26 extends diagonally from lower right to upper left. Housing 12 is provided by a pair of shrouds 86 and 88, FIGS. 1, 3 removably mated to each other along an interface 90 coincident with gasket 76 including diagonal side segments 82 and 84 of the gasket. Inlet 14 is in shroud housing section 86. Outlet 16 is in shroud housing section 88. The shrouds are removably mounted to each other, for example, by hinges or clips such as 92 at one end, and clamps such as 94 at the other end. The shrouds preferably pinch and compress gasket 76 therebetween along the entire perimeter thereof including gasket segments 78, 80, 82, 84.

Figure 4:
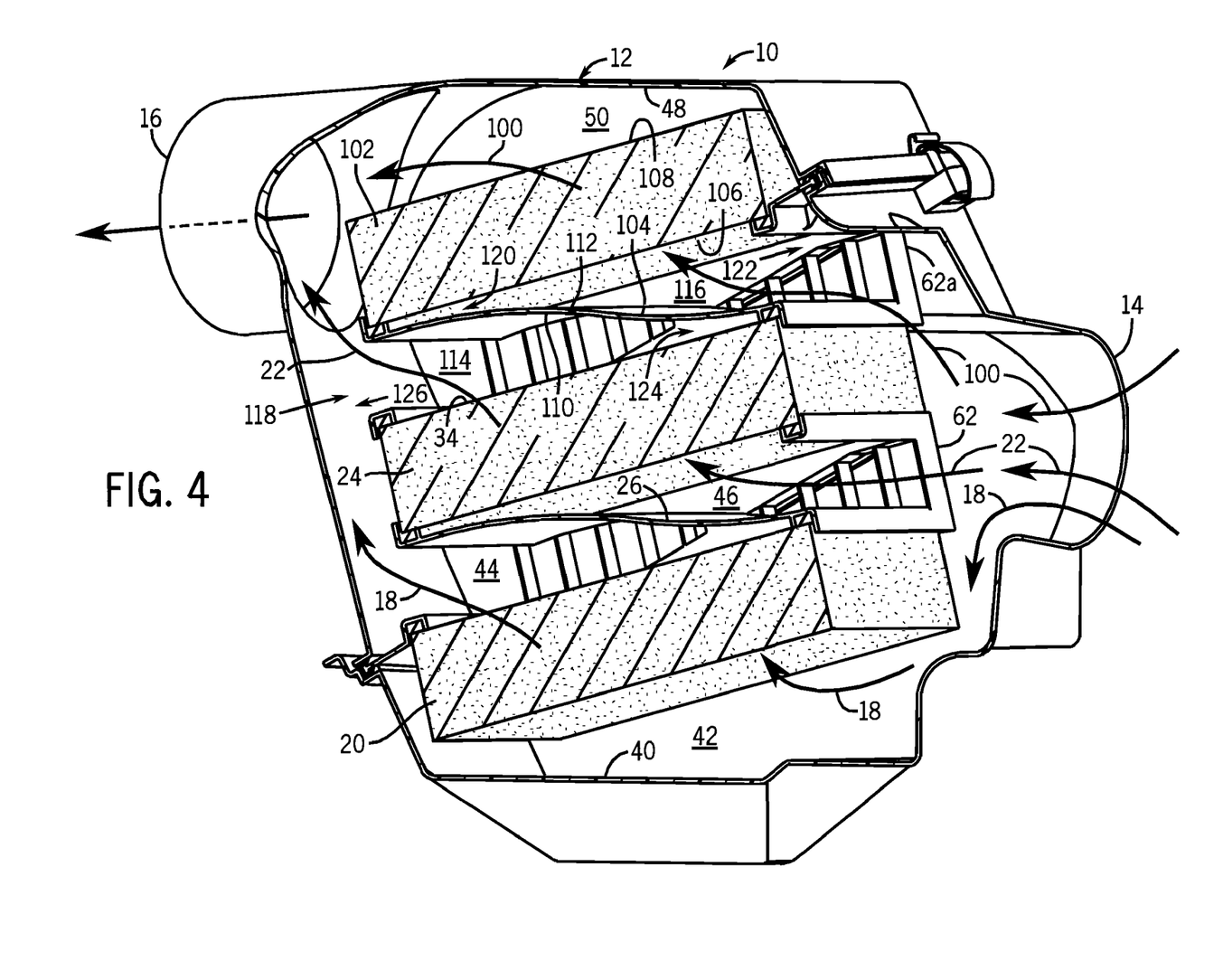
FIG. 4 is like FIG. 1, and shows a further embodiment.

The above principles may be applied to multiple flow filter systems wherein the filter housing may have multiple flow passages including the noted first and second flow passages and one or more additional flow passages therethrough. FIG. 4 shows a further embodiment and uses like reference numerals from above where appropriate to facilitate understanding. A third flow passage 100 is provided through housing 12 from inlet 14 to outlet 16, and includes a third filter element 102 filtering fluid flowing along third flow passage 100. First and second and third flow passages 18 and 22 and 100 are in parallel with each other such that incoming fluid flow at inlet 14 is split into first and second and third parallel flow paths in first and second and third flow passages 18 and 22 and 100, respectively, and flows through first and second and third filter elements 20 and 24 and 102, respectively, and re-joins at outlet 16. First and second and third flow passages 18 and 22 and 100 through respective first and second and third filter elements 20 and 24 and 102 are independent of each other. The housing has a second internal dividing wall 104 separating second and third flow passages 22 and 100. Fluid in first flow passage 18 flows through first filter element 20 to the exclusion of and bypassing second and third filter elements 24 and 102. Fluid in second flow passage 22 flows through second filter element 24 to the exclusion of and bypassing and first and third filter elements 20 and 102. Fluid in third flow passage 100 flows through third filter element 102 to the exclusion of and bypassing first and second filter elements 20 and 24. Third filter element 102 has an upstream face 106 receiving incoming fluid along third flow passage 100 from inlet 14, and a downstream face 108 delivering filtered fluid along third flow passage 100 to outlet 16. Second internal dividing wall 104 has a first surface 110 facing downstream face 34 of second filter element 24, and a second surface 112 facing oppositely to first surface 110 and facing upstream face 106 of third filter element 102. Internal dividing wall 104 has the noted first surface 110 defining a plenum 114 between surface 110 and downstream face 34 of second filter element 24. Internal dividing wall 104 has the noted second surface 112 defining a plenum 116 between surface 112 and upstream face 106 of third filter element 102. Housing sidewalls 40 and 48 in FIG. 4 are spaced by first filter element 20, first internal dividing wall 26, second filter element 24, second internal dividing wall 104, and third filter element 102 respectively in serial spatial alignment therebetween. More specifically in FIG. 4, sidewalls 40 and 48 are spaced by plenum 42, first filter element 20, plenum 44, first internal dividing wall 26, plenum 46, second filter element 24, plenum 114, second internal dividing wall 104, plenum 116, third filter element 102, and plenum 50 respectively in serial spatial alignment therebetween. Plenums 42 and 46 and 116 communicate with each other and with inlet 14. Plenums 44 and 114 and 50 communicate with each other and with outlet 16. Second and third filter elements 24 and 102 are spaced from each other by a gap 118, by a second spacer 62a comparable to spacer 62. Internal dividing wall 104 is a diagonal wall which diagonally spans gap 118 and defines an upstream triangular shaped plenum 116 having a closed corner end 120 at upstream face 106 of third filter element 102, and having an open end 122 communicating with inlet 14. Diagonal wall 104 also defines a downstream triangular shaped plenum 114 having a closed corner end 124 at downstream face 34 of second filter element 24, and having an open end 126 communicating with outlet 16. Diagonal wall 104 preferably has a non-rectilinear wave shape providing increased entrance area at upstream open end 122 of triangular shaped plenum 116 and reduced area at closed corner end 120 of triangular shaped plenum 116, and providing increased exit area at downstream open end 126 of triangular shaped plenum 114 and reduced area at closed corner end 124 of triangular shaped plenum 114. Fourth, fifth, and so on, multiple filter elements and flow passages may be provided in accordance with the above teachings.

Present Application

Figure 5:
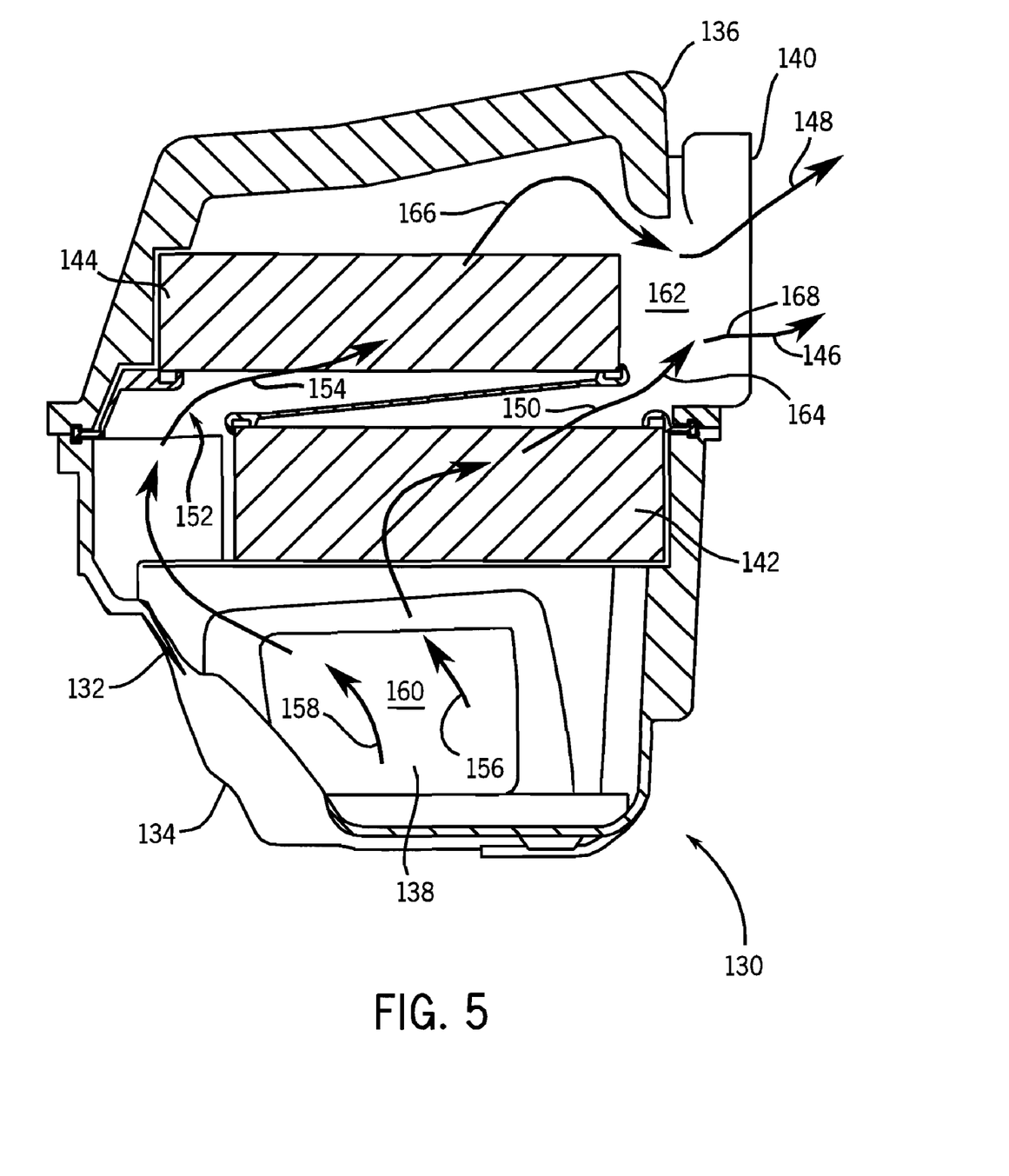
FIG. 5 is a cut-away sectional view of a filter constructed in accordance with the invention.

FIG. 5 shows a filter 130 including a housing 132 having a bottom 134 and a top 136, each having a respective port 138 and 140 therethrough. One of the ports, e.g. port 138, is an inlet port, and the other of a ports, e.g. port 140, is an outlet port, though their roles may be reversed, i.e. port 140 may be the inlet, and port 138 may be the outlet. A plurality of filter elements such as 142, 144, etc. are provided in the housing, each defining a respective filtering flow path 146 and 148 therethrough from inlet port 138 to outlet port 140. The filtering flow paths 146 and 148 are in parallel with each other. The housing has a fluid flow path therethrough preferably selected from the group consisting from: a) bottom-in, top-out, as shown in FIG. 5; and b) top-in, bottom- out, if the inlet and outlet functions of ports 138 and 140 are reversed. Each arrangement provides space efficiency and greater use of existing volume in designated applications.

The fluid flow path through housing 132 is split into parallel branches 146 and 148 each provided by a respective parallel filtering flow path through a respective filter element 142 and 144. Fluid enters the housing along a first fluid flow direction through inlet port 138, e.g. out of the page as viewed in FIG. 5. Fluid exits the housing along a second fluid flow direction through outlet port 140, e.g. rightwardly as viewed in FIG. 5. In the embodiment of FIG. 5, the noted second fluid flow direction is different than the noted first fluid flow direction. Other orientations and directions of fluid flow may be used to provide desirable bottom-in, top-out flow, or top-in, bottom-out flow. In one desirable embodiment, as shown in FIG. 5, the noted second fluid flow direction at outlet port 140 is 90° offset from the noted first fluid flow direction at inlet port 138.

The embodiment of FIG. 5 includes first and second filter elements 142 and 144, and first and second fluid flow branches 146 and 148. Fluid flows through inlet port 138 and splits into the noted first and second branches. First branch 146 flows through first filter element 142, and second branch 148 flows through second filter element 144. The first branch has at least a first bend 150 therealong, which bend is downstream of first filter element 142 such that fluid flow turns at least once while traversing from first filter element 142 to outlet port 140. Second branch 148 has at least first and second bends 152 and 154 therealong, each of which bends 152, 154 of second branch 148 is upstream of second filter element 144 such that fluid flow turns at least twice while traversing from inlet port 138 to second filter element 144. In the embodiment of FIG. 5, first branch 146 has a second bend 156, namely when the fluid flows out of the page in the orientation of FIG. 5 and then turns upwardly in the orientation of FIG. 5. Bend 156 of first branch 146 is upstream of first filter element 142. Second branch 148 has a third bend 158 in the orientation of FIG. 5, namely where the fluid flows out of the page in FIG. 5 and then turns upwardly in FIG. 5. Third bend 158 of second branch 148 is upstream of first filter element 142 and upstream of first and second bends 152 and 154 of second branch 148 and upstream of second filter element 144. Fluid flow through inlet port 138 splits at a split point 160 at the noted second bend 156 of first branch 146 and third bend 158 of second branch of 148.

Fluid flows through outlet port 140 from a merge point 162 of first and second branches 146 and 148. First branch 146 flows through first filter element 142 to the merge point, and second branch 148 flows through second filter element 144 to the merge point. In one embodiment, first branch 146 has downstream bends 150 and 164 downstream of filter element 142 such that fluid flow turns at least twice while traversing from filter element 142 to outlet port 140. Second branch 148 has a downstream bend 166 downstream of second filter element 144. First branch 146 may have a yet further bend 168 downstream of filter elements 142 and 144 and bends 150 and 164.

Figure 6:
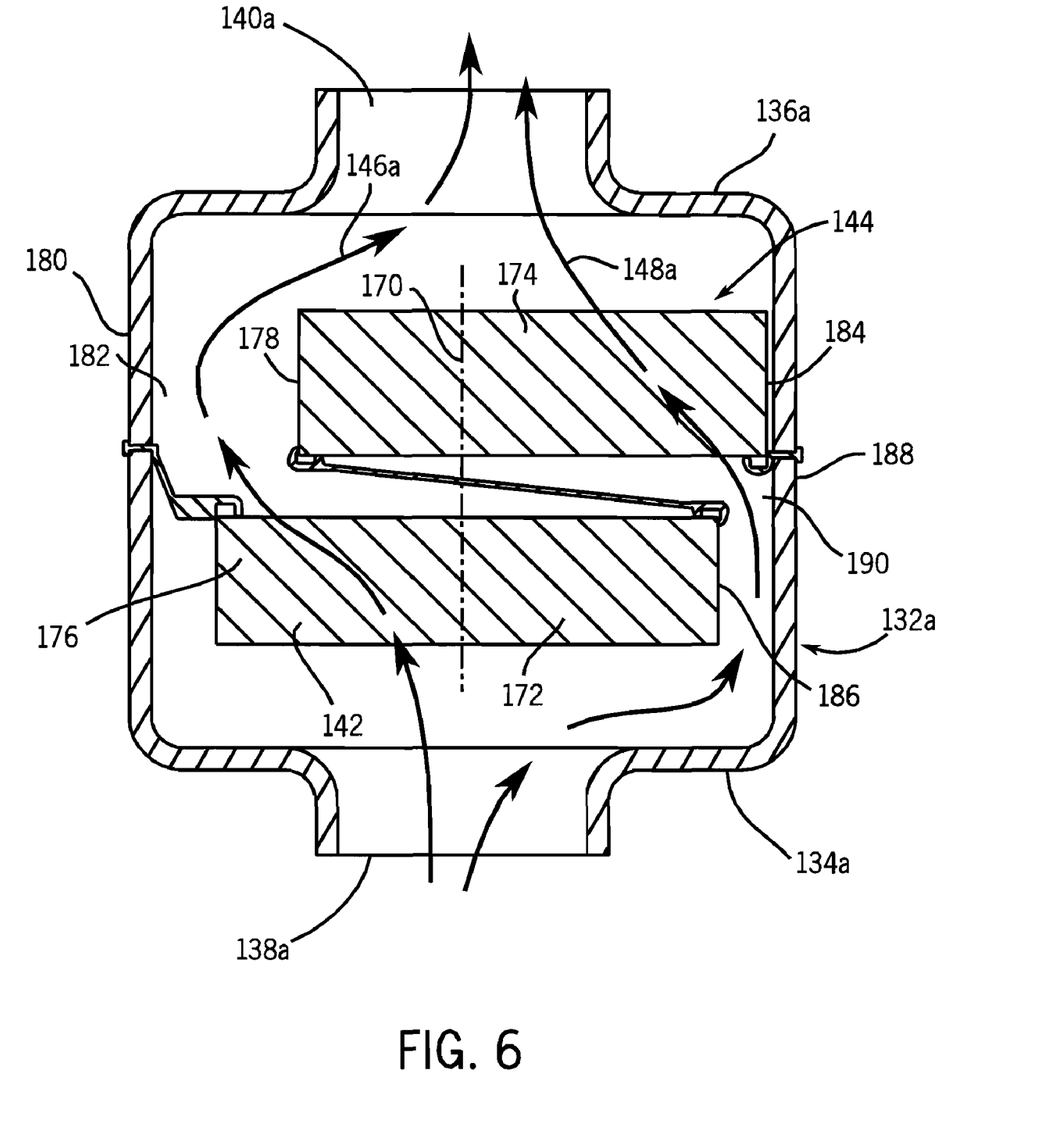
FIG. 6 is a perspective cut-away view like a portion of FIG. 5 and showing a further embodiment.

FIG. 6 shows a further embodiment and uses like reference numeral from above where appropriate to facilitate understanding. Filter housing 132a has the noted distally opposite ends provided by bottom 134a and top 136a each having a respective port 138a and 140a therethrough providing inlet port 138a and outlet port 140a, respectively, though the inlet and outlet roles may be reversed. A plurality of filter elements such as 142, 144 are axially spaced from each other in the housing along an axial direction along an axis 170, each defining a respective filtering flow path 146a, 148a therethrough from inlet port 138a to outlet port 140a. The filtering flow paths 146a and 148a are in parallel with each other. At least two of the filter elements such as 142 and 144 have respective overlapped sections 172 and 174 axially aligned with each other. At least one of the filter elements has a radial extension section 176 non-axially aligned with the other filter element 144. Filter element 144 has a boundary edge 178 radially spaced inwardly of a sidewall 180 of the housing by a radial gap 182 therebetween. Radial extension section 176 of filter element 142 is axially aligned with radial gap 182. One of the parallel fluid flow paths, e.g. path 146a, traverses axially through filter element 142 including radial extension section 176, and axially through radial gap 182 along boundary edge 178 of filter element 144 without passing through filter element 144.

In one embodiment, filter element 144 has a radial extension section 184 non-axially aligned with filter element 142. Filter element 142 has a boundary edge 186 radially spaced inwardly of a second section 188 of the sidewall of the housing by a second radial gap 190. Radial extension section 184 of filter element 144 is axially aligned with second radial gap 190. The other of the noted parallel flow paths, namely flow path 148a, traverses axially through second radial gap 190 along boundary edge 186 of filter element 142 without passing through filter element 142 and axially through filter element 144 including radial extension section 184 thereof.

Figure 7:
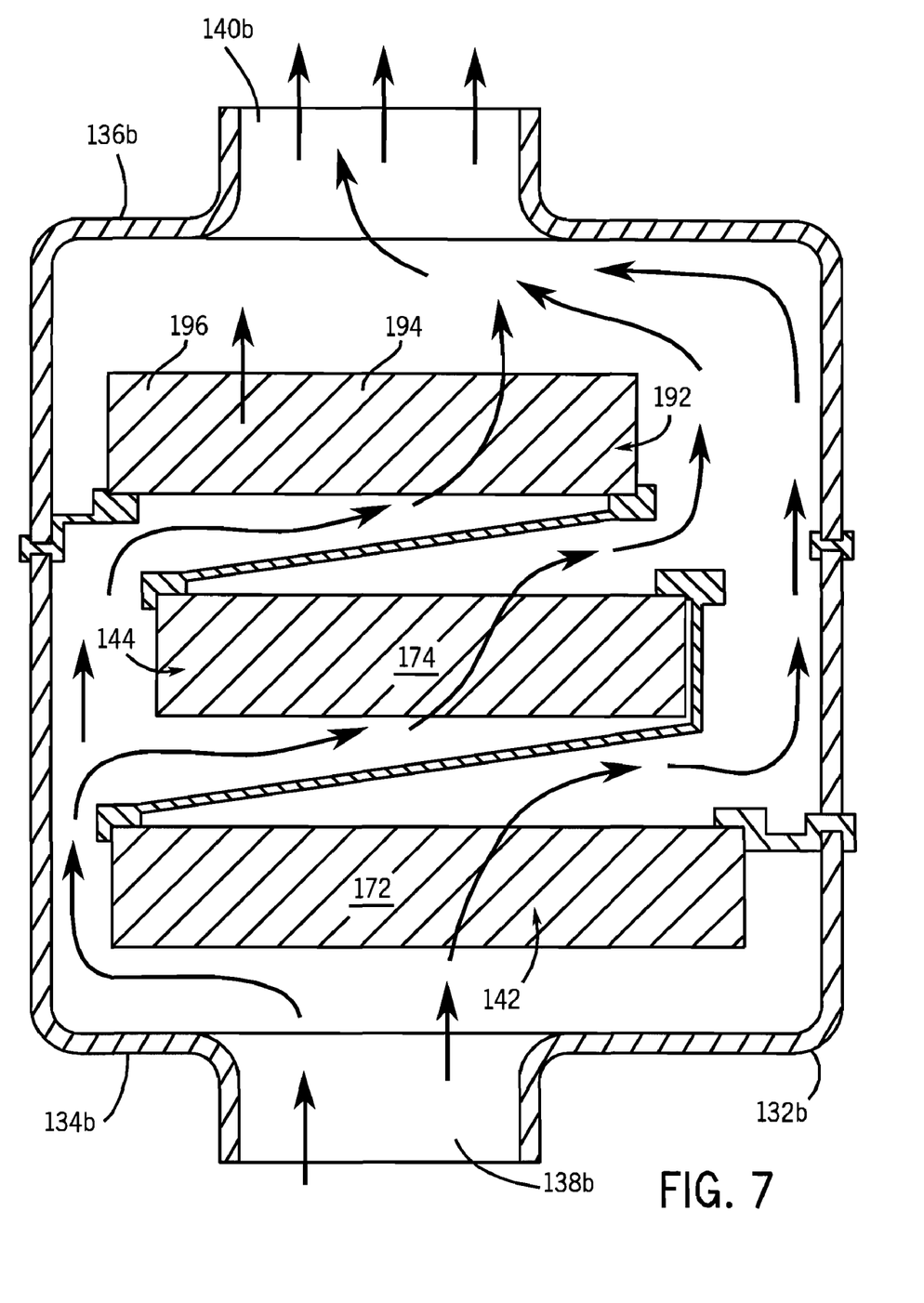
FIG. 7 is like FIG. 6 and shows a further embodiment.

FIG. 7 shows a further embodiment and uses like reference numerals from above where appropriate to facilitate understanding. A third filter element 192 is axially spaced from the above noted two filter elements 142, 144 in housing 132b having bottom 134b and top 136b providing inlet and outlet ports 138b and 140b, though their roles may be reversed. Third filter element 192 has an overlapped section 194 axially aligned with at least one of the noted overlapped sections 172 and 174 of first and second filter elements 142 and 144. Third filter element 194 has a radial extension section 196 non-axially aligned with at least a selected one of the noted two filter elements, e.g. filter element 144. In the preferred embodiment, overlapped section 194 of third filter element 192 is axially aligned with both of the noted overlapped section 172 and 174 of the first and second filter elements 142 and 144. Further in the preferred embodiment, radial extension section 196 of third filter element 192 is non-axially aligned with only one of the noted two filter elements 142 and 144, namely filter element 144, and is axially aligned with the other of the noted two filter elements, namely filter element 142.

In the foregoing description, certain terms have been used for brevity, clearness, and understanding. No unnecessary limitations are to be implied therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims.

What is claimed is:

1. A filter comprising a housing having a bottom and a top, each having a respective port therethrough, one of said ports being an inlet port, the other of said ports being an outlet port, a plurality of filter elements in said housing, each defining a respective filtering flow path therethrough from said inlet port to said outlet port, said filtering flow paths being in parallel with each other, said housing having a fluid flow path therethrough selected from the group consisting of: a) bottom-in, top-out; and b) top-in, bottom-out providing space efficiency and greater use of existing volume in designated applications, wherein said fluid flow path through said housing is split into plural branches, each provided by a respective said parallel filtering flow path through a respective said filter element, and comprising first and second said filter elements, and first and second said branches, wherein fluid flows through said outlet port from a merge point of said first and second branches, said first branch flowing through said first filter element to said merge point, said second branch flowing through said second filter element to said merge point, said second branch having at least a first bend therealong, said first bend being upstream of said second filter element such that fluid flow turns at least once while traversing from said inlet port to said second filter element, said first branch having at least first and second bends therealong, each of said first and second bends of said first branch being downstream of said first filter element such that fluid flow turns at least twice while traversing from said first filter element to said outlet port, wherein:

said second branch has a second bend;

said second bend of said second branch is downstream of said second filter element;

said first branch has a third bend;

said third bend of said first branch is downstream of said second filter element and downstream of said first and second bends of said first branch and downstream of said first filter element.

2. A filter comprising a housing having a bottom and a top, each having a respective port therethrough, one of said ports being an inlet port, the other of said ports being an outlet port, a plurality of filter elements in said housing, each defining a respective filtering flow path therethrough from said inlet port to said outlet port, said filtering flow paths being in parallel with each other, said housing having a fluid flow path therethrough selected from the group consisting of: a) bottom-in, top-out; and b) top-in, bottom-out providing space efficiency and greater use of existing volume in designated applications, wherein said fluid flow path through said housing is split into plural branches, each provided by a respective said parallel filtering flow path through a respective said filter element, and comprising first and second said filter elements, and first and second said branches, wherein fluid flows through said inlet port and splits into said first and second branches, said first branch flowing through said first filter element, said second branch flowing through said second filter element, wherein in combination said first branch has at least one bend downstream of said first filter element, and said second branch has at least two bends upstream of said second filter element, wherein:

said first branch has at least two bends, one downstream of said first filter element and another upstream of said first filter element;

said second branch has at least three bends, all upstream of said second filter element.

3. A filter comprising a housing having distally opposite ends each having a respective port therethrough providing an inlet port and an outlet port, respectively, a plurality of filter elements axially spaced from each other in said housing along an axial direction along an axis, each defining a respective filtering flow path therethrough from said inlet port to said outlet port, said filtering flow paths being in parallel with each other, at least two of said filter elements having respective overlapped sections axially aligned with each other, at least one of said two filter elements having a radial extension section non-axially aligned with the other of said two filter elements, and comprising a third said filter element axially spaced from said two filter elements, said third filter element having an overlapped section axially aligned with at least a designated one of said overlapped sections of said two filter elements, said third filter element having a radial extension section non-axially aligned with at least a selected one of said two filter elements.

4. The filter according to claim 3 wherein said overlapped section of said third filter element is axially aligned with both of said overlapped sections of said two filter elements.

5. The filter according to claim 4 wherein said radial extension section of said third filter element is non-axially aligned with only one of said two filter elements and is axially aligned with the other of said two filter elements.

* * * * *